Dec. 30, 1969 R. J. MISTARZ 3,486,423
MACHINE FOR AUTOMATICALLY FORMING, FILLING, CLOSING
AND SEALING PLASTIC COATED GABLE TOP
CARTONS OF PAPERBOARD OR THE LIKE
Filed June 3, 1966 8 Sheets-Sheet 1

INVENTOR
Robert J. Mistarz
by Max R. Kraus
Atty

Dec. 30, 1969   R. J. MISTARZ   3,486,423
MACHINE FOR AUTOMATICALLY FORMING, FILLING, CLOSING
AND SEALING PLASTIC COATED GABLE TOP
CARTONS OF PAPERBOARD OR THE LIKE
Filed June 3, 1966   8 Sheets-Sheet 2

TOP SEAL

OVEN

DEFOAM

FILL

FILL

FILL

TOP BREAKER

Dec. 30, 1969 R. J. MISTARZ 3,486,423
MACHINE FOR AUTOMATICALLY FORMING, FILLING, CLOSING
AND SEALING PLASTIC COATED GABLE TOP
CARTONS OF PAPERBOARD OR THE LIKE
Filed June 3, 1966 8 Sheets-Sheet 4

Dec. 30, 1969   R. J. MISTARZ   3,486,423
MACHINE FOR AUTOMATICALLY FORMING, FILLING, CLOSING
AND SEALING PLASTIC COATED GABLE TOP
CARTONS OF PAPERBOARD OR THE LIKE
Filed June 3, 1966   8 Sheets-Sheet 5

Dec. 30, 1969     R. J. MISTARZ     3,486,423
MACHINE FOR AUTOMATICALLY FORMING, FILLING, CLOSING
AND SEALING PLASTIC COATED GABLE TOP
CARTONS OF PAPERBOARD OR THE LIKE
Filed June 3, 1966     8 Sheets-Sheet 6
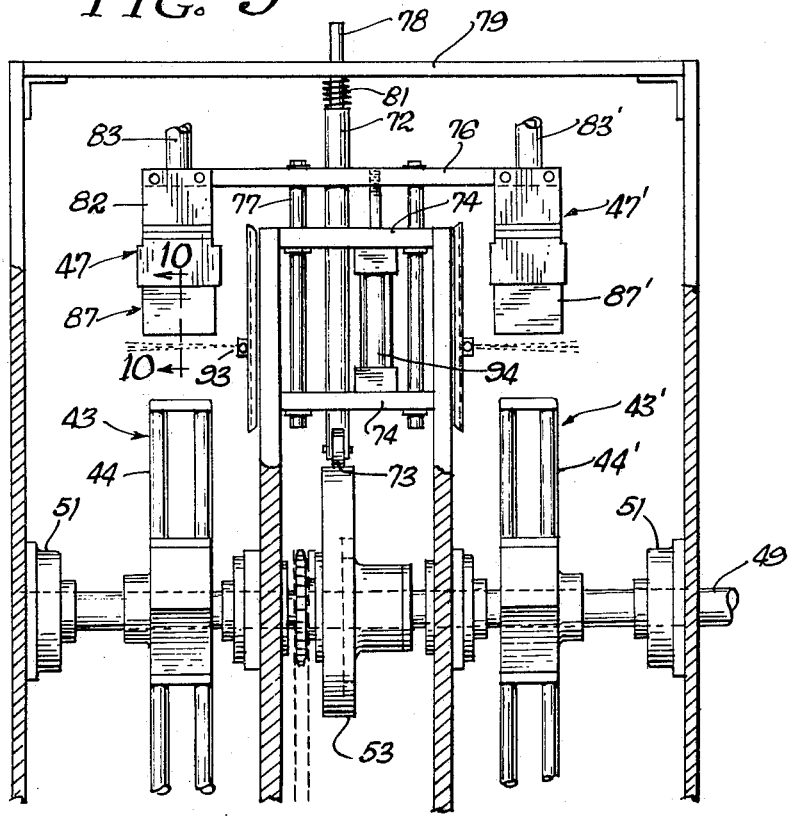
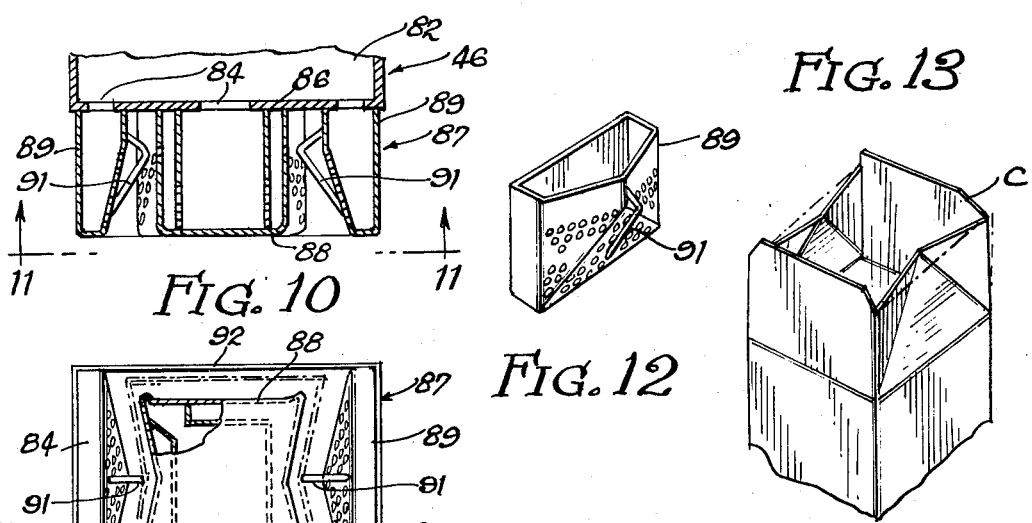

Dec. 30, 1969   R. J. MISTARZ   3,486,423
MACHINE FOR AUTOMATICALLY FORMING, FILLING, CLOSING
AND SEALING PLASTIC COATED GABLE TOP
CARTONS OF PAPERBOARD OR THE LIKE
Filed June 3, 1966   8 Sheets-Sheet 7

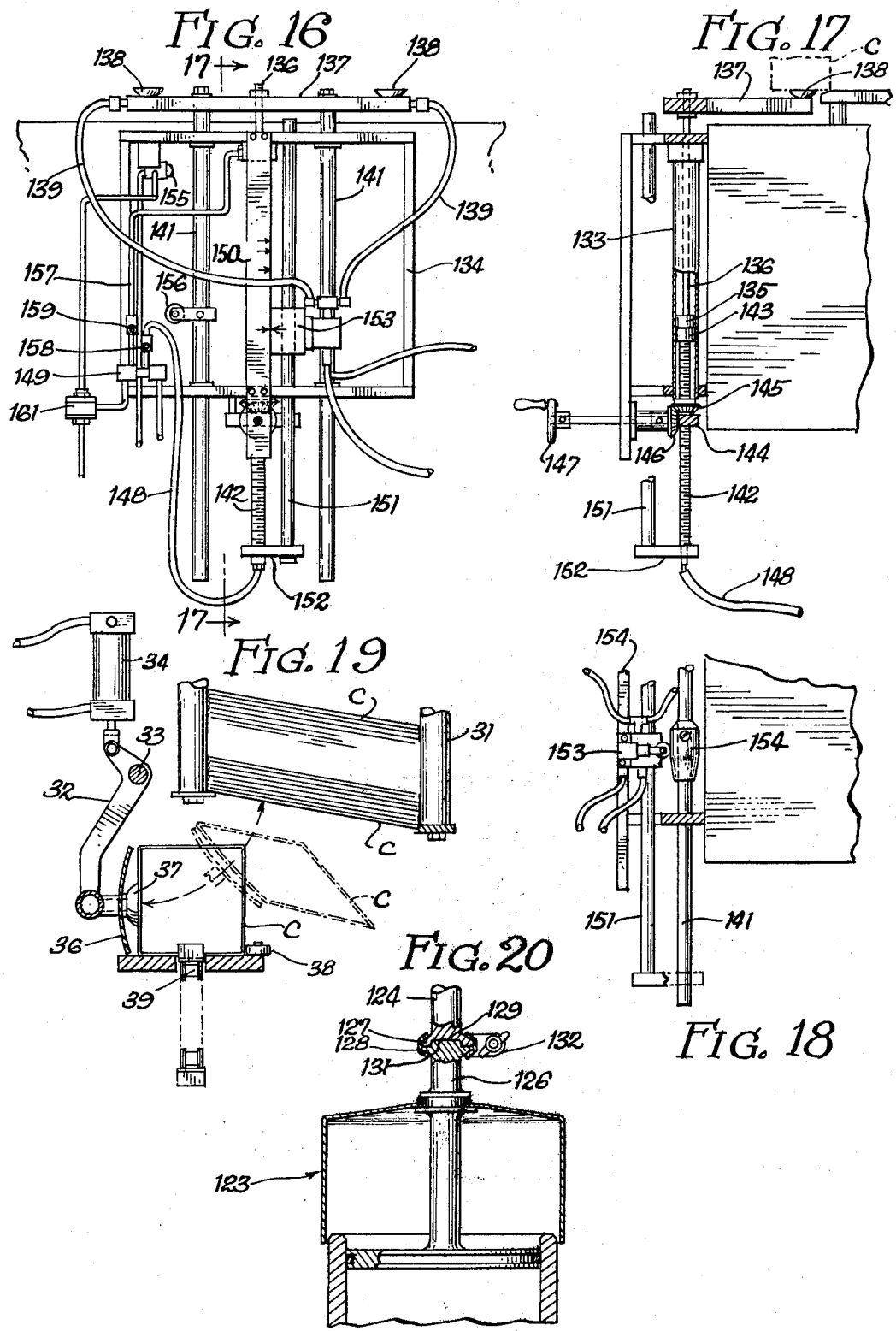

United States Patent Office 3,486,423
Patented Dec. 30, 1969

3,486,423
MACHINE FOR AUTOMATICALLY FORMING,
FILLING, CLOSING AND SEALING PLASTIC
COATED GABLE TOP CARTONS OF PAPER-
BOARD OR THE LIKE
Robert J. Mistarz, Northbrook, Ill., assignor to Illinois
Creamery Supply Co. and Chicago Stainless Equipment
Corporation, Chicago, Ill., both corporations of Illinois
Filed June 3, 1966, Ser. No. 559,634
Int. Cl. C31b 1/78, 5/60
U.S. Cl. 93—53                    8 Claims

ABSTRACT OF THE DISCLOSURE

A machine for forming cartons of paperboard or the like from blanks which includes means for erecting the blanks into open ended tubular form and then moving the blanks through a series of stations for breaking the folds of the bottom closure parts and for closing and sealing these parts. The partially formed cartons are stripped from the forming mechanism in a vertical position and are deposited on a bar track which is disposed between the inner reaches of two generally parallel endless chains having dogs which engage the cartons and move them along the bar track to a series of stations where they are filled and sealed. The bar track is adjustable vertically to accommodate different sizes of cartons of different heights so that the top portions of the cartons are alined with the stations. The adjustability of the track bar and the cooperating conveyor means affords a high degree of versatility to the machine so that it may be very easily adapted to a number of sizes of cartons without the addition or substitution of parts to the machine.

---

This invention relates to a machine for automatically forming, filling, closing and sealing plastic coated gable top cartons of paperboard or the like.

One of the objects of this invention is the provision of an improved unitized machine for automatically forming plastic coated carton blanks into erected cartons, filling the same with a liquid, and closing and sealing the cartons into fluid-tight packages.

Another object of this invention is the provision of a machine of the foregoing character which is capable of filling relatively large volume cartons at a high rate of production.

Another object of this invention is the provision of a machine arranged to operate on two lines of carton blanks simultaneously whereby to effect a double production rate.

Another object of this invention is the provision in a machine of the foregoing character of positive cam operated means for effecting actuation of certain components of the machine.

Another object of this invention is the provision of improved means for withdrawing and buckling the carton blanks as they are withdrawn from the magazine supply.

A further object of this invention is the provision of improved mechanically operated suction means for withdrawing the partially formed cartons from the supporting mandrels.

A still further object of this invention is the provision of improved means for conveying the partially formed cartons from the forming means to the filling, closing and sealing means.

Still a further object of this invention is the provision of improved means for breaking the carton blanks along the score lines and maintaining such broken condition during heating of the same to activate the thermoplastic coating for adhesion.

A still further object of this invention is the provision of improved clamp means for readily assembling and disassembling the liquid delivery pumps for cleaning.

Other and further objects and advantages of this invention will become apparent from the following description when the same is considered in connection with the accompanying drawings, in which:

FIG. 9 is a cross-sectional view taken substantially on line 9—9 of FIG. 8.

FIG. 10 is a fragmentary cross-sectional view of a heating unit.

FIG. 11 is a bottom plan view looking in the direction of the arrows 11—11 of FIG. 10.

FIG. 12 is a perspective view of a component of a heating unit.

FIG. 13 is a fragmentary perspective view of the bottom of a carton blank following breaking of the score lines.

FIG. 16 is an elevational view illustrating a modified embodiment of means for stripping partially formed cartons from the mandrels.

FIG. 17 is a cross-sectional view taken substantially on line 17—17 of FIG. 16.

FIG. 18 is a fragmentary elevational view of certain structural details illustrated in FIGS. 16 and 17.

FIG. 19 is a more or less diagrammatic elevational view illustrating the means for withdrawing flat carton blanks from the magazine and erecting the same into open ended tubular condition.

FIG. 20 is a cross-sectional view of a detail, illustrating a liquid delivery pump and the clamping means which affords ready assembly and disassembly of the parts for cleaning.

The machine of the present invention is intended to process conventional thermoplastic coated gable top cartons formed of paperboard or the like and presently extensively employed for packaging milk and other liquids. The carton blank as it is delivered to the machine for processing is folded upon itself and has its side seam already adhesively secured, thus defining a collapsed open-ended tube. The closure parts at each end are suitably scored and the carton when erected and subsequently processed in the machine results in a container which is self-sustaining in shape.

The machine of the present invention comprises a console, generally indicated by the numeral 30, and supplied with utilities such as electric power, heating gas, compressed air and cooling water from appropriate external sources. An operator's control and indicator panel and an emergency stop bar (not shown) are carried on one of the walls of the console 30. Housed within the console and also arranged on a top portion thereof are the various component mechanisms which operate on the carton blanks, as will be hereinafter described.

MAGAZINE, FEEDER AND LOADER MECHANISMS

Figure 1:
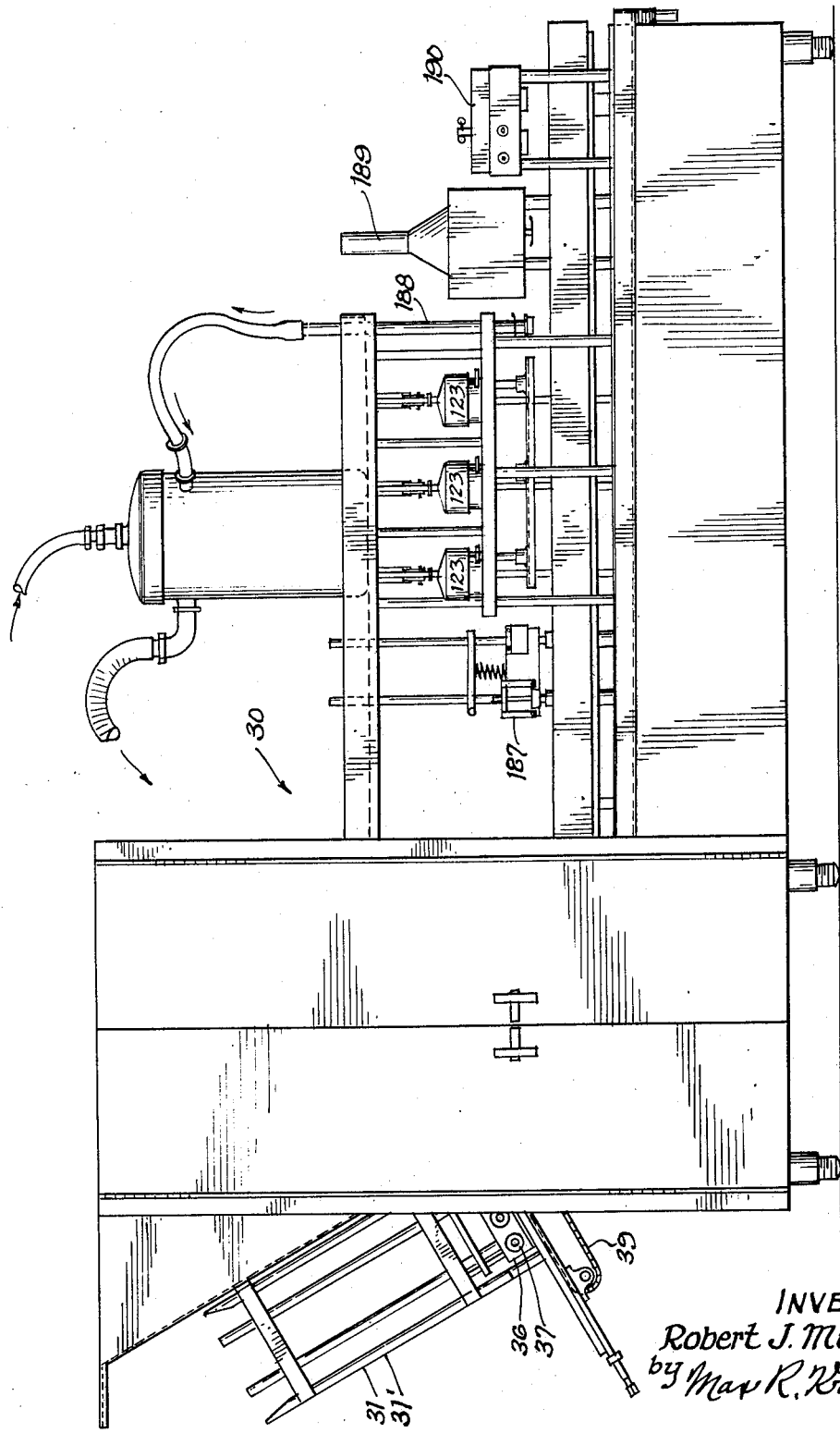
FIG. 1 is a side elevational view of a machine embodying the present invention.
Figure 2:
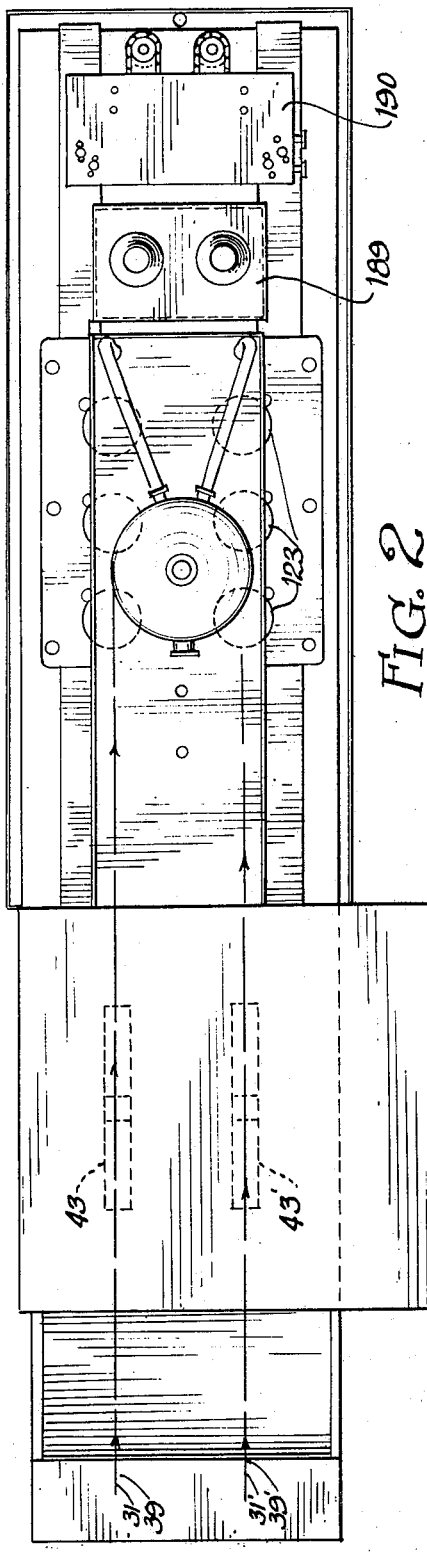
FIG. 2 is a top plan view thereof.
Figure 3:
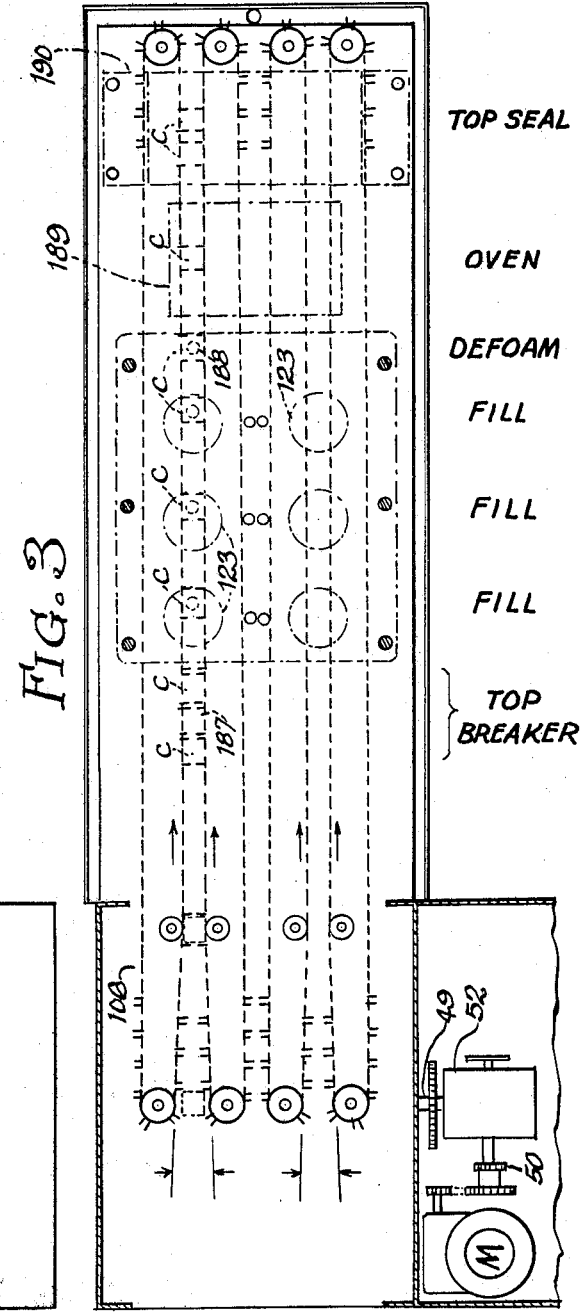
FIG. 3 is a plan view showing more or less diagrammatically the conveyor means and the several operating stations of the machine serviced by the conveyor means.

Referring particularly to FIGS. 1 to 3 inclusive, the machine is provided with duplicate mechanisms in parallel relation for performing identical functions whereby two lines of cartons are caused to be formed, filled and sealed concurrently. In the following description only one of said mechanisms will be described with corresponding mechanisms being identified by similar primed numerals.

A pair of magazines 31, 31' are each formed of a plurality of spaced-apart guide bars, each adapted to receive a stack of carton blanks C in collapsed condition, each stack being retained in place by means of suitable stop abutments disposed at the lower end of each magazine. In the course of operation of the machine, blanks are withdrawn successively from the bottom ends of the magazines by means of suitable feeding devices and are successively operated on by the various component mechanisms of the machine. Disposed below each magazine 31 is a feeder mechanism, such as illustrated in FIG. 19, which comprises a crank arm 32 pivoted as at 33 and operated by a double acting pneumatic cylinder 34. Connected to the opposite end of the crank arm 32 is a rectangular warp plate 36 which is bowed across its width, as illustrated, and disposed along a median line of said plate are a plurality of suction cups 37, each suitably connected to suction means. As will be observed, the lips of the cups 37 normally project beyond the edges of the warp plate 36. The plate and cups are adapted to swing through an arc of somewhat less than 90° and the cups are caused to engage a side panel of the lowermost blank C in the magazine 31. In such engagement the side panel is caused to be bowed, as illustrated by the broken line in FIG. 19, with the edges of the panel abutting corresponding edges of the warp plate 36. This facilitates withdrawal of the carton blank from the magazine and on the return swing the blank C is erected into open-ended tubular form, as illustrated by the solid lines in FIG. 19, and is maintained in such form between rollers 38 abutting opposite panels of the carton blank. The carton blank then is engaged by one of a series of dogs carried on an endless chain 39 and is caused to move up an incline until it telescopes over a registering mandrel 41 which is part of the carton bottom forming machine mechanism, indicated generally by the numeral 42.

BOTTOM FORMING MECHANISM

Figures 4, 4A:
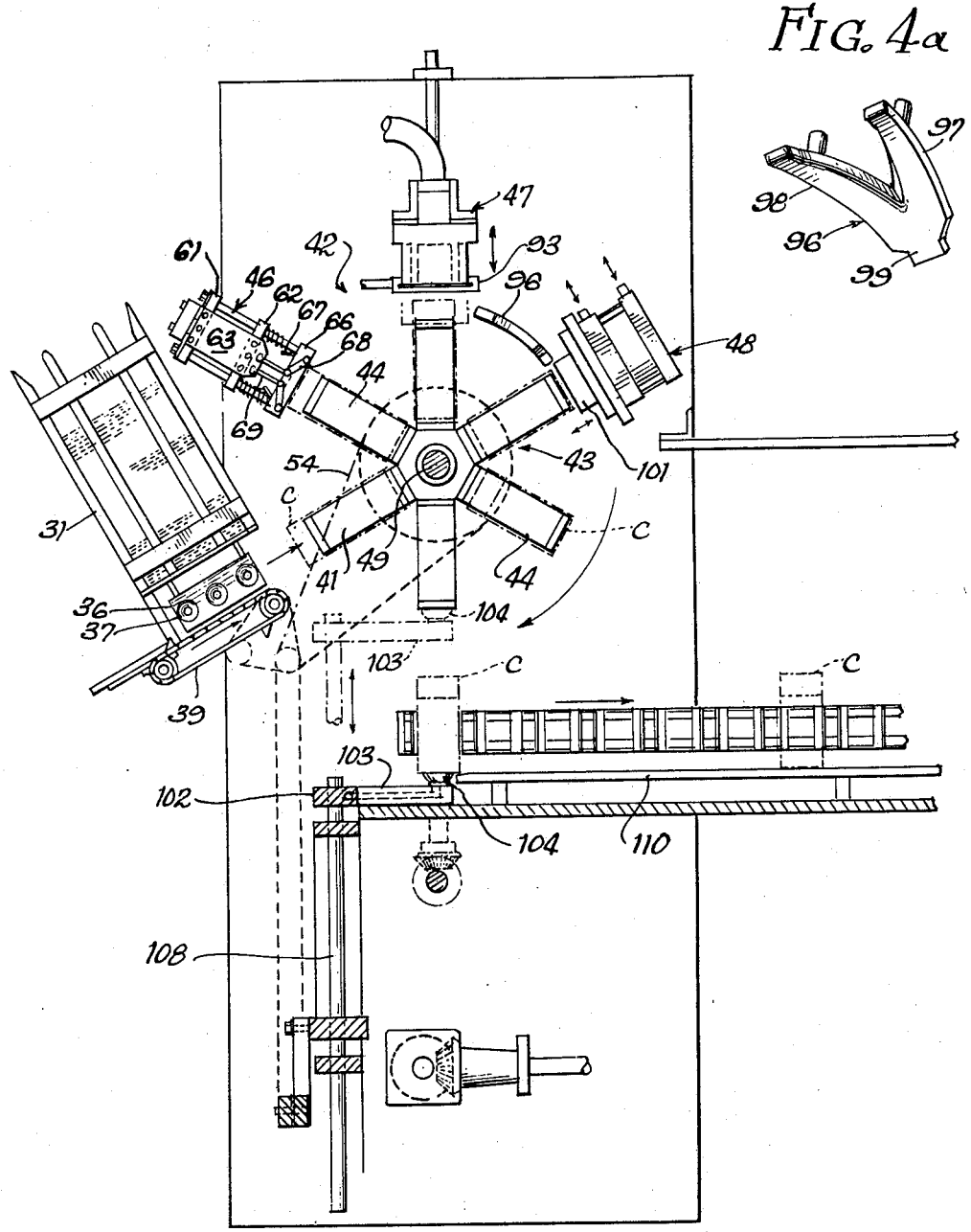
FIG. 4 is a side elevational view with certain parts removed showing the carton erecting, forming and conveyor means.
FIG. 4A is a perspective view, on an enlarged scale, of a carton closure part folding element.

Referring to FIG. 4, the bottom forming mechanism comprises a pair of intermittently and rotatably driven mandrel assemblies 43, 43', each carrying a plurality of radially disposed mandrels 44, in this instance six in number, and a plurality of cooperating station units with which the mandrels are adapted to register sequentially and cooperate during the course of their rotational indexing movement. These stations are a bottom closure parts breaker 46, a heater unit 47, and a bottom closure and sealing unit 48. The mandrel assemblies 43, 43' are keyed to a shaft 49 which is journaled in bearings 51 carried in the walls of the console. The shaft 49 is driven by a motor M through a suitable gear train and intermittent drive means 52. The mandrel assemblies 43, 43' are spaced so as to be in registration with respective carton feeding means 39, 39' associated with respective magazines 31, 31'.

Figure 7:
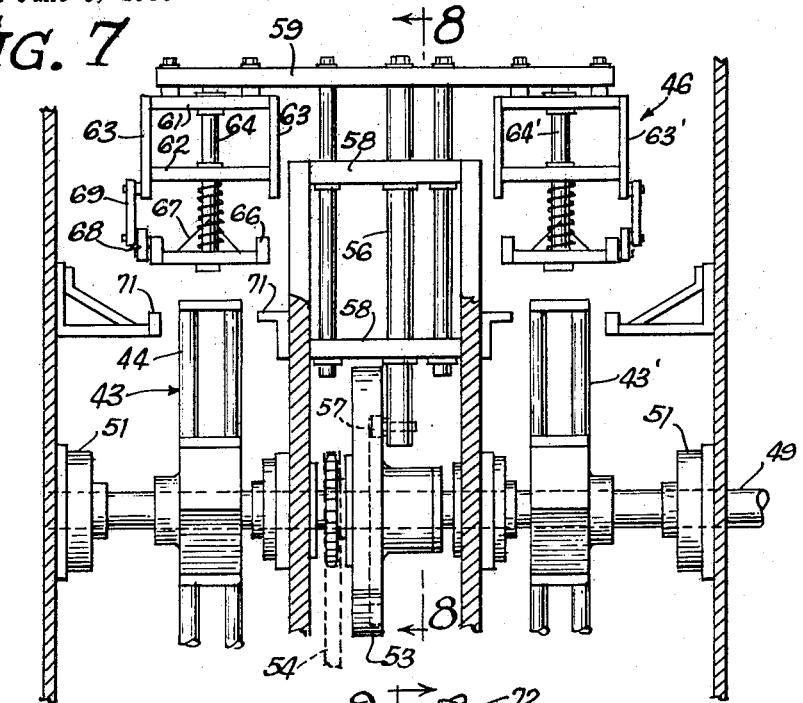
FIG. 7 is a cross-sectional view taken substantially on line 7—7 of FIG. 8, and showing the mandrel assemblies and associated breaker mechanisms.
Figure 8:
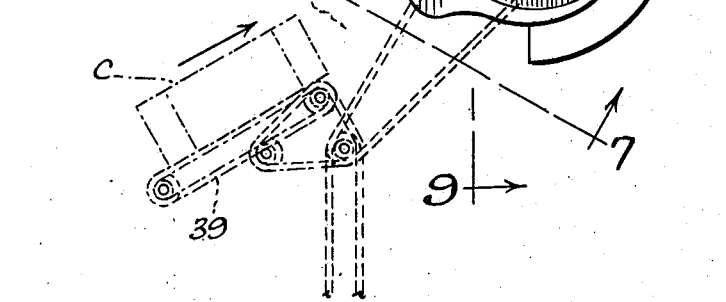
FIG. 8 is a cross-sectional view taken substantially on line 8—8 of FIG. 7.

Referring to FIGS. 7, 8 and 9, a box cam 53 is mounted medially of the shaft 49 for relative rotational movement and is driven by a sprocket and chain 54 which is operatively connected to sprocket wheel 50 which effects continuous rotation of the cam during operation of the machine. Referring to FIG. 7, the breaker mechanism 46 comprises a rod 56 provided with a cam follower roller 57 at its lower end, said roller cooperating with the box cam 53. The rod 56 is arranged to reciprocate in suitable bearings provided in transverse frame members 58. Supported on the upper end of the rod 56 is a transverse member 59 carrying the breaker components at each end. Each component comprises a pair of spaced plate 61, 62, the upper plate 61 of which is attached to the member 59 and the plates being connected together by side members 63. A pair of rods 64 depend from the upper plate member 61 and pass through suitable openings in the lower member 62. Supported by the rods 64 is a frame 66 which includes a pair of folder wings 67 arranged in opposed relation, the wings being pivotally supported in the frame 66 and connected by a crank lever 68 and a link 69 to the side members of the assembly. It will be apparent that as the rod 56 is caused to move downwardly by the cam 53 the entire assembly is carried in a corresponding direction until the frame 66 engages a pair of stops 71 supported on the frame of the console which limit the movement of the frame 66 in a downward direction. However, the associated upper structure continues to move in a downwardly direction so as to effect a rocking of the folder wings 67 which engage the closure parts of the carton blank and effect substantial prebending of said parts on their respective score lines and toward their closed positions to the extent that there is a permanent set in the paperboard and its thermoplastic coating. The relationship of the closure parts of the carton blank C after pre-bending is illustrated in FIG. 13.

Following the breaking or pre-bending of the bottom closure parts, the mandrel assembly 43 indexes the carton blank around to the heater unit 47 which is caused to be moved into registration with said closure parts of the carton blank, as will be presently explained.

Referring to FIGS. 8 and 9, a rod 72, provided at its lower end with a cam follower roller 73 arranged to ride on the periphery of cam 53 is mounted for reciprocation in transverse frame members 74 of the console. The rod carries a transverse bar 76 to which are affixed a pair of depending guide rods 77 which are received in registering openings in the transverse frame members 74. The upper end 78 of the rod 72 is of reduced diameter and is adapted to be received in an opening in a transverse frame member 79. A spring 81 is interposed between the shoulder of the rod and the transverse member 79. Depending from the ends of the bar 76 are heater units 47, 47', each in registration with a corresponding mandrel assembly 43, 43'. Each heater unit 47 comprises a plenum chamber 82 having an inlet opening connected by a conduit 83 to a combustion chamber of a combustion system and apparatus, hereinafter to be described. Suffice it to say at this point that the combustion system delivers a blast of heated air to the plenum chamber 82 at a temperature of about 850° F. This blast of air impinges on a baffle plate (not shown) disposed within the plenum chamber before it passes out through the apertures 84 in the bottom wall 86 of the chamber.

Attached to the bottom wall 86 of the heater unit is a heater head 87 which includes a center element 88 formed of suitable sheet metal and shaped substantially as illustrated in FIGS. 10 and 11. The walls of said center element 88 are perforated according to a desired pattern to provide discharge apertures so that heated air passing therethrough will impinge on predetermined areas of the carton closure parts to activate the thermoplastic coating thereon. The heater head 87 also includes two outer elements 89, 89 formed substantially as illustrated in FIG. 12 and arranged in spaced relation on opposite ends of the center element 88, as illustrated in FIGS. 10 and 11.

The outer elements similarly are perforated to provide a desired pattern of discharge aperatures.

Referring to FIG. 12 it will be seen that each of the outer elements 89 is provided with a rigid wire member 91, generally L-shaped, and secured at both ends to the element 89 in the manner illustrated. As will be seen clearly in FIG. 10, each member 91 extends into the space between an end heater element 89 and the center element 88 and affords an inclined surface to engage a closure part of the carton blank, as will be presently explained.

When the carton blank is indexed to register with the heater unit 47 the follower roller 73 is just beginning to ride on the low portion of the periphery of cam 53 which provides a period of dwell to afford a desired heating interval. Thus, the heater unit 47 is caused to move from the solid line position to the broken line position illustrated in FIG. 4. In such position the center element 88 enters the open end of the carton blank C and the prebent closure parts thereof are disposed in the spaces between the center and outer elements 88 and 89 respectively. As seen in FIG. 11, a pair of plates 92 is provided at opposite sides of the heater head 87 to completely enclose the center element 88. Thus, the other straight closure parts of the carton blank are received in the spaces between the flat faces of the center element 88 and the outer plates 92 during the heating interval. The bottom closure parts are substantially completely embraced on all four sides by the heater head 87 and jets of heated air are caused to be discharged from the center element 88 and to impinge on all of the inner surfaces of the closure parts desired to be heated, while only the outer surfaces of the inwardly folded closure parts are heated by jets of heated air from the outer elements 89.

There is normally a tendency during the heating operation for the closure parts of the carton blank, which have already been broken or pre-bent along the score lines, to straighten out when heated. As a result, some difficulty may be experienced in the further folding of the closure parts for the final sealing operation. It will be noted that the members 91 serve to maintain the closure parts in pre-bent condition and prevent their returning to a straight condition. It will be understood that in the case of certain types of carton blanks it may be possible to dispense with the first stage of pre-folding of the closure parts as with the use of breaker means, hereinbefore described, and to rely solely on the members 91 to effect the necessary pre-bending for the final closure and sealing of the carton.

At the completion of the heating cycle, the follower roller 73 at the lower end of the rod 72 is caused to ride on the high part of the cam periphery, thereby effecting elevation of the rod 72 and the associated components, substantially to the position illustrated in FIG. 9 wherein the heating units 47, 47' are elevated above the mandrels 44, 44'. The mandrel assembly 43 is then caused to index and to carry the carton blank to the next station which comprises the bottom sealing unit. 48.

In the event of a temporary stoppage of the machine due to some emergency or jamming, provision is made for preventing thermal injury to the carton blank which may be in close proximity to the heater head 87. Referring to FIG. 9, there is shown a nozzle 93 disposed immediately below the level of the heater head 87 when the same is in retracted normal non-operative position. The nozzle 93 is connected to a source of compressed air controlled by a valve, not shown, which is automatically actuated upon stoppage of the machine to cause the nozzle to discharge a blast of cooling air between the heater head 87 and the carton blank and thereby to deflect the heat away from the carton blank. Referring to FIG. 9, it will be seen that an air cylinder 94 is carried between the transverse members 74 of the frame with its piston rod connected to the transverse bar 76. Upon stoppage of the machine, the air cylinder 94 is caused to be actuated to extend its piston rod upwardly and thereby move the heater heads 47, 47' to non-operative position. The flow of heated air discharged from the heater head is not reduced or modified, but is maintained at normal operating level during such stoppage. It will be noted that when the air cylinder 94 is caused to be operated to elevate the heater heads 47, 47' and associated components, the cam follower 73 is elevated above the cam 53 and is maintained at some space thereabove until normal operation of the machine again resumed. It will be apparent that upon resumption of normal operation, if the heater actuating assembly were caused to drop by gravity on the lower part of the cam 53, injury might result both to the cam and to the cam follower 73. Accordingly, the means controlling the air cylinder 94 is synchronized with the movement of the cam 53 so that the heater actuating assembly will move downwardly only when the high part of the cam 53 is in position to be engaged by the follower 73, thereby reducing the amount of travel of the assembly and minimizing any possibility of injury to the parts.

When the carton blank is caused to be indexed to the bottom sealing station 48, the thermoplastic coating on the closure parts has been heated to a temperature sufficient to activate the adhesive action of the coating and, in such condition, the coating will adhere to itself and to complementary hot surfaces. Referring to FIGS. 4 and 4A, disposed between the heating station 47 and the bottom closure and sealing station 48 is a V-shaped guide 96, shaped substantially like that illustrated in FIG. 4A. The legs 97 and 98 of said guide are arcuately formed and each leg is adapted to engage a respective carton closure flap and to hold the same inwardly with one flap in overlapping relation to the other. It will be apparent that in the folding-in operation, the underlying closure flap must be folded in to a somewhat greater degree than the overlying closure flap in order that proper closure of the parts may be effected. It will be apparent that engagement or touching of the edges of the cooperating closure flaps would result in injury to the carton blank. Accordingly, the leg 97 of the V-shaped guide 96 which is adapted to engage the underlying closure flap is formed with a sharper curvature than the other leg 98 so as to effect folding of the underlying flap at a somewhat faster rate and thereby bring the same into position so that its marginal edge portion is disposed in position to underlie the marginal edge portion of the cooperating flap.

Referring to FIG. 4, it will be seen that the trailing end portion 99 of the guide 96 is disposed immediately adjacent the pressure pad 101 of the bottom sealing unit 48 which is operated by an air cylinder. Accordingly, the closure flaps are maintained in proper overlapped relationship so that when pressure is applied by the pad 101 on the bottom of the carton, sealing of the parts is effected. It will be understood that the pressure pad includes a plurality of embossments which are adapted to form dams on the carton closure parts to effect transverse sealing of certain of the seams of the carton.

The bottom of the carton blank is now sealed and the mandrel assembly 43 is caused to index through another step and to carry the carton blank to a station having no operating unit. This affords access to the interior of the machine to facilitate cleaning and also an additional interval for cooling of the activated adhesive, since the closed bottom is in intimate contact with the plate of the mandrel which is cooled by a circulating coolant.

In the final indexed position of the mandrel assembly, which completes a cycle, the mandrel carrying the partially formed carton is disposed in vertical registration with the carton blank stripper mechanism, presently to be described.

STRIPPER MECHANISM

Figure 14:
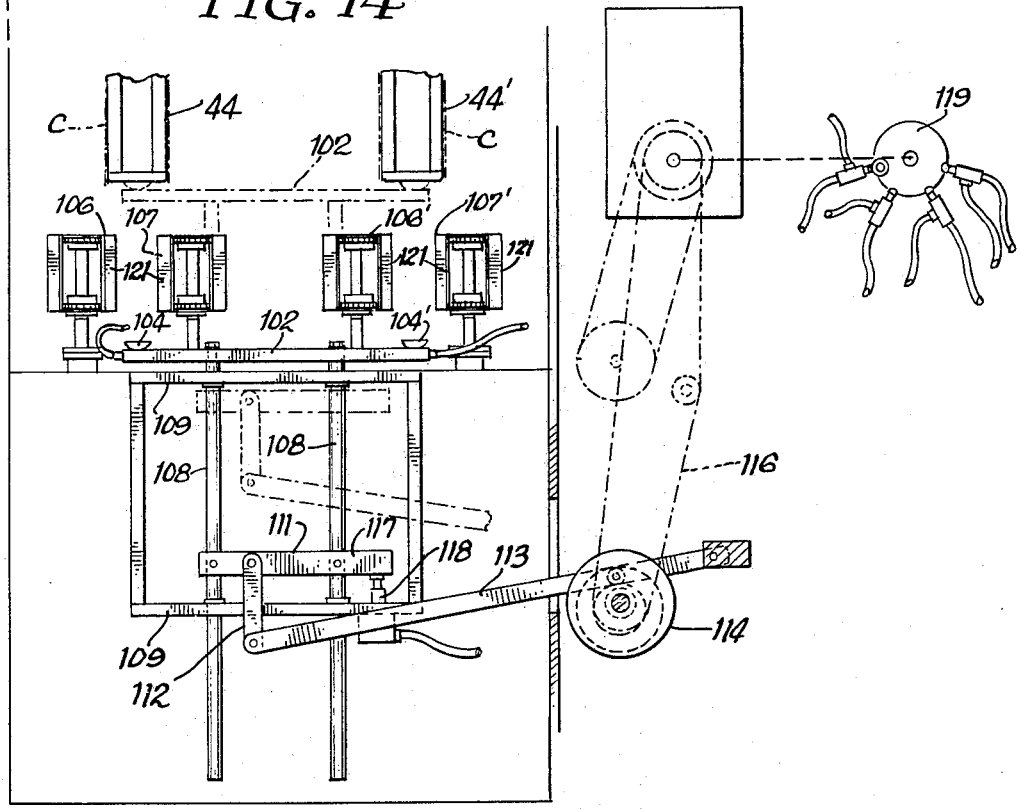
FIG. 14 is an elevational view showing the means for stripping the partially formed cartons from the mandrels, and associated operating mechanism.

Referring to FIG. 14, the stripper mechanism includes a generally U-shaped member 102 on the end portions of the legs 103 of which are carried suction cups 104, each connected by a suitable conduit to suction means. As will be noted in FIG. 5, each leg 103 of the U-shaped member 102 enters into the space between the inner reaches of cooperating conveyor chains 106 and 107 and is alined with the supporting track bar 110 on which the carton blanks are moved, as will be hereinafter described. The U-shaped member 102 is supported on the upper ends of a pair of guide rods 108 which are arranged to reciprocate in transverse members 109 of a substantially rectangular frame mounted on the console. The rods 108 are connected together by a tie bar 111 which is connected by a link 112 to a cam lever 113 operated by a box cam 114 continuously driven by a chain and sprocket drive means 116 operatively connected to the power drive means of the machine. One end of the cam lever 113 is pivotally connected to a fixed point on the console and it will be apparent that as the cam 114 is caused to be rotated the assembly including the rods 108 and U-shaped member 102 are caused to be moved between the solid and broken line positions illustrated in FIG. 14. The movement of the stripper mechanism is synchronized with the movement of the mandrel assembly 43 so that when the carton blank reaches the stripping station, as illustrated in FIG. 4, the suction cups 104, 104' which are disposed in registration with the sealed carton bottoms are caused to ride upwardly and engage said bottoms and, in moving downwardly, to strip the partially formed cartons from the respective mandrels. In its lowermost position, as illustrated in the solid lines in FIG. 4, the bottom of the carton blank is substantially in the plane of the top of the track bar 110 disposed between the conveyor chains 106 and 107. Referring to FIG. 14, the tie bar 111 is provided with an extension 117 which is adapted to engage a valve 118 which controls the vacuum in the suction cups. It will be understood that when the stripper assembly is in the solid line position illustrated in FIG. 14 and the valve control 118 is engaged by the extension 117 the vacuum is cut off to the cups 104 so that the carton blanks are released for movement by the conveyor means.

It will be understood that suitable means, such as a roller type switch 119, as illustrated in FIG. 14, and driven by the drive means of the machine, controls suitable solenoid valves which control the vacuum means and flow of compressed air to the several components hereinabove described.

CONVEYOR

The conveyor means comprises a pair of endless chain assemblies 106 and 107 driven by sprocket wheels and arranged in substantially spaced parallel relation. The chain assemblies carry carton engaging dogs 121 longitudinally spaced and arranged in transverse registration, as seen clearly in FIG. 5. The conveyor means transports the partially formed carton blanks over a track bar 110 to a series of stations, as will be hereinafter described.

Figure 5:
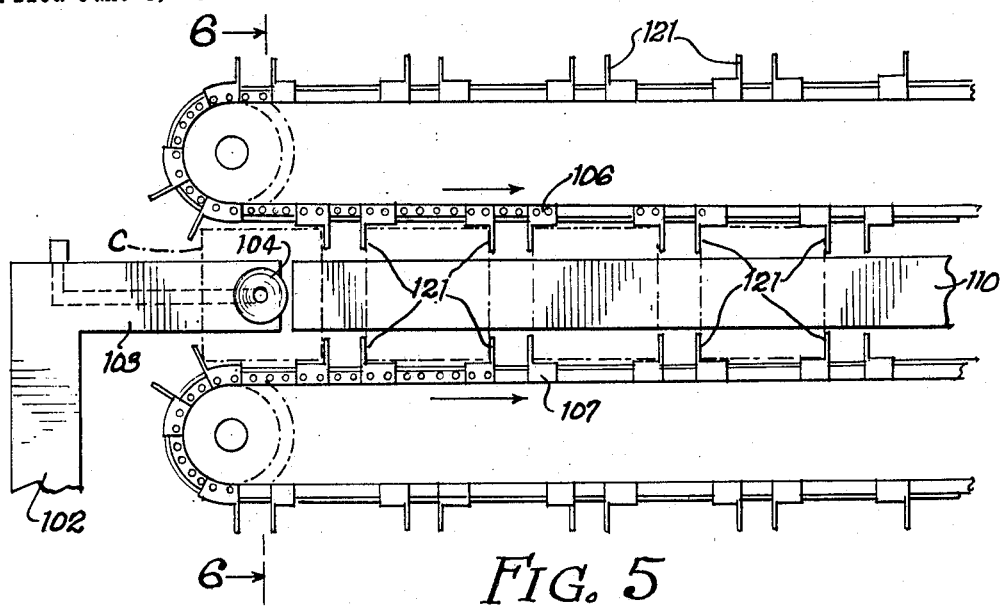
FIG. 5 is a fragmentary plan view of the carton conveying means.
Figure 6:
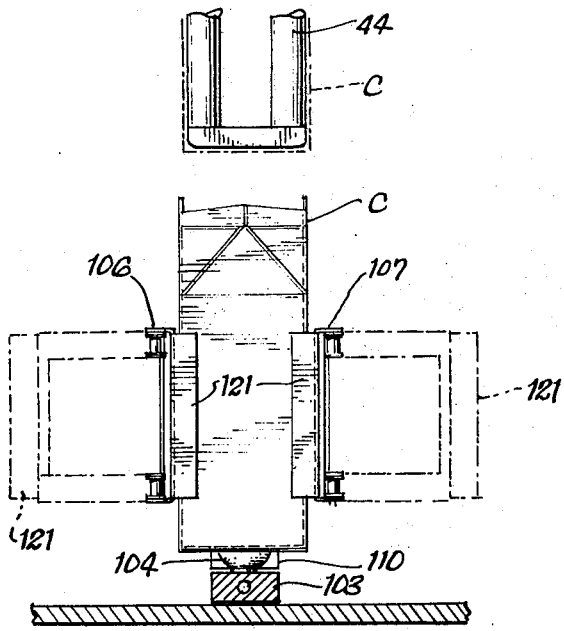
FIG. 6 is a cross-sectional view taken substantially on line 6—6 of FIG. 5.

Referring to FIG. 5, it will be seen that at the leading end of the track bar 110 at the point where the partially formed cartons are caused to be moved into position by the stripper mechanism to be acted upon by the chains 106 and 107, the chains are spaced at a somewhat greater distance apart to afford a tapering lead-in for receiving the cartons. At the lead-in portions of the chains 106 and 107 the cooperating dogs 121 on the chains are not disposed in co-planar relationship but are angularly related to each other. Accordingly, the positioning of the dogs affords clearance around all sides of the cartons which prevents injury to the cartons as they are stripped from the mandrels. In their movement over the track bar 110 the cartons are snugly embraced by the conveyor means and are maintained in erect positions with the bases of the cartons sliding over the track bar.

As illustrated in FIG. 5, the cartons are caused to be indexed successively at a plurality of stations which are indicated diagrammatically and identified by legends in FIG. 3 and are similar to those described in my co-pending application Ser. No. 409,911, now Patent No. 3,405,-505. In the present embodiment however, three filling stations are provided, in view of the fact that the carton blanks intended to be operated upon by the present machines are of the one-half gallon size, thus, each filling station provides substantially one-third of the quantity of total liquid delivered to the carton so as to maintain the filling interval at each station within desired limits.

FIG. 20 illustrates an improvement of the filling apparatus described in my copending application Ser. No. 409,911, now Patent No. 3,405,505. In the present instance the piston rod of each filler pump 123 is formed of two complementary sections 124 and 126, each terminating in a tapered flange 127 and 128 respectively. Section 124 is provided with a recess 129 and section 126 is provided with a projection 131 received in said recess. Said sections are adapted to be held together by a clamp 132 which is readily removable so that the rod section 126 and associated components may be readily separated from rod section 124 for cleaning.

Referring to FIGS. 16–18, the modified carton stripper mechanism therein illustrated is actuated by pneumatic means and embodies adjustable features, as will be presently explained. The stripper mechanism includes a double acting pneumatic cylinder 133 supported on a frame 134 associated with the console. The pneumatic cylinder 133 includes a piston 135 and a piston rod 136 on the upper end of which is carried a U-shaped member 137, similar to the member 102 hereinbefore described, there being suction cups 138 supported at the ends of the U-shaped member and connected by flexible conduits 139 to vacuum means. A pair of guide rods 141 depend from the member 137 and pass through suitable bearings provided in the transverse members of the frame 134. The adjustment means for the stripper mechanism comprises a hollow screw member 142 provided with an enlarged head 143 at its upper end arranged to be received within the pneumatic cylinder 133 in fluid-tight relation. The screw member 142 passes through a cooperating threaded member 144 fixed to a beveled gear 145 which is in operative engagement with a cooperating beveled gear 146 driven by a crank 147. As will be apparent rotation of the crank will effect upward or downward vertical movement of the screw member 142. The lower end of the screw member is connected by a flexible conduit 148 to valve means 149 which is connected to a source of compressed air and as air is admitted into one end of the pneumatic cylinder 133 the piston 135 of the cylinder will be caused to raise the U-shaped member 137 so that the suction cups 138 engage the sealed bottoms of carton blanks which are carried on mandrels disposed in registration with the cups. The screw member 142 is tied to a guide rod 151 by a tie bar 152 which prevents the screw member 142 from rotating. As will be apparent the guide rod 151 moves vertically with the screw member 142.

A roller controlled type valve 153 is mounted on the guide rod 151 and is movable with said rod when a vertical adjustment of the screw member is effected. Referring to FIG. 16, it will be seen that reference markings are carried on a fixed vertical plate 150 which is supported on the frame 134, each of these markings relating to a specific size of carton blank being processed by the machine. For example, going from top to bottom, the reference arrows might indicate half pint, one-third quart, one pint and one quart sizes. A cooperating reference marking is carried on the housing of the valve 153 and as the crank 147 is turned to raise or lower the screw member 142 the guide rod 151 and valve 153 will move correspondingly so as to be in proper position for operation on a particular size carton blank.

The valve 153 is actuated by a cam element 154 which is carried on one of the guide rods 141, as seen clearly in FIG. 18. Reciprocating vertical movement of the guide rod 141 with the U-shaped member 137 effects operation of the valve 153 which controls the suction on the suction cups 138. A button valve 155 supported on a vertical member of the frame 134 is adapted to be actuated by a roller 156 which is mounted on the other guide rod 141 for effecting downward movement of piston 135 of the pneumatic cylinder. The upper and lower ends of the pneumatic cylinder 133 are connected by conduits 148 and 157 to the valve means 149 which is a four way valve which controls the operation of the cylinder 133. In each of the conduits 148 and 157 there is interposed a control valve 158 and 159 respectively, for controlling the speed of travel of the piston 135. A settling valve 161 connected to the button valve 155 and to the four way valve 149 operates to insure the downward movement of the piston and associated mechanism.

It will be understood that the hereinabove described modified stripper mechanism may be used in combination with the hereinabove described machine, or with a machine of the type as described in my copending application Ser. No. 409,911 filed Nov. 9, 1964, now Patent No. 3,405,505, in which the track bar 110 on which the cartons are caused to be conveyed by the conveyor chains is vertically adjustable. It will be understood that when different sizes of cartons are operated on by the machine, the track bar must be raised or lowered, as the case may be, to adapt the positions of the closure portions of the carton blanks to the closing and sealing means which are, of course, at a fixed elevation. Thus, it is necessary to adjust the height of the track bar to accommodate carton blanks ranging from the half-pint size to the full quart size, each of such cartons, of course, conventionally having identical bottom surface areas. The hereinabove described stripper mechanism affords means for adjusting the lower position of the suction cups 137 to register with the adjusted position of the track bar so that the two are in the same plane and the cartons may move easily on the track bar.

Figure 15:
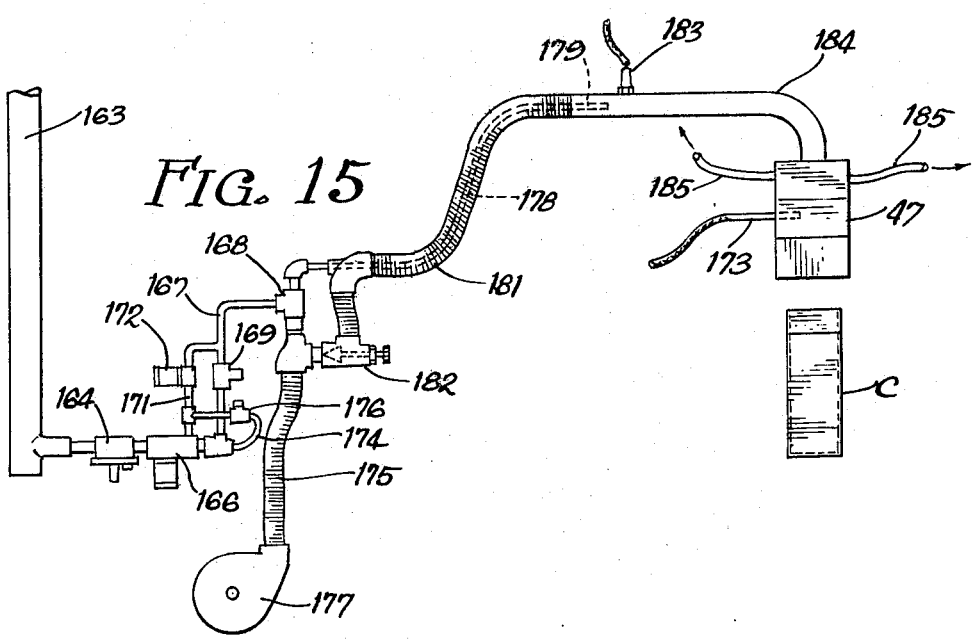
FIG. 15 is a piping diagram illustrating the components of the heating system.

Referring to FIG. 15, wherein is illustrated the combustion system of the machine, the numeral 163 indicates a main conduit connected to a supply of heating gas to which are connected in series a gas pressure 164 regulator and a solenoid operated main gas valve 166. A conduit 167 connects the main gas valve to a mixing T 168 and interposed in said conduit is a flow control valve 169 to control the main gas flow. A second conduit 171 connects the downstream end of the solenoid valve 166 to the conduit 167 at a point downstream of the flow control valve 169. Interposed in said second conduit 171 is a solenoid valve 172 to control the high fire, said solenoid valve being connected to a thermostat 173 which is disposed within the heating unit 47. A by-pass conduit 174 connects the downstream end of the solenoid valve 166 through a high fire valve 176 to the second conduit 171 between the valve 172 and the main solenoid valve 166. The mixing T 168 is also connected by conduit 175 to an air blower 177. Thus, a gas and air mixture emerges from the mixing T 168 and passes through a conduit 178 provided with a nozzle at its end. Said conduit is disposed within a conduit 181 of larger diameter, the upstream end of which is connected to a cone valve 182 which is connected to the blower 177. Accordingly, air is carried in the larger conduit 181 in the space surrounding the inner conduit 178. A spark plug 183 is mounted in the conduit 181 in close proximity to the nozzle 179 to effect ignition of the gas air mixture as it discharges from the nozzle 179. Complete combustion of gas is effected at that point and the conduit 184 which connects to the heating unit 47 carries only heated air to the unit. The upper portion of the heater unit 47 is surrounded by a water jacket which is connected by conduits 185 to a coolant supply. It will be apparent from the foregoing that only heated air at an accurately controlled temperature impinges on the carton closure parts with no flame or combustion taking place in the heater unit.

Briefly stated the operation of the machine is as follows. Carton blanks C are withdrawn one by one from the bottom of the stack in the magazine 31 by the feeding mechanism and erected to open-ended tubular formation, as illustrated in FIG. 19, at which point the carton blank is deposited on a conveyor chain 39 where the rearward edge of the carton is engaged by a dog which moves it into telescoping relation with a registering mandrel 44. The carton blank so loaded on the mandrel is next indexed to the bottom closure breaker mechanism 46 which breaks the score lines and prebends the closure parts substantially to the condition illustrated in FIG. 13. Thereafter, the carton blank is indexed to the heating station in registration with the heater unit 47 which is operated by the cam 53 to descend into a position to embrace the bottom closure parts of the carton blank. Upon completion of the heating interval during which the thermoplastic coating on desired portions of the closure parts is activated, the heater unit 47 is elevated by the cam 53 to the solid line position illustrated in FIG. 4 so that the carton may be indexed to the next final sealing position. In passing to this position the closure parts of the carton blank wipe under a V-shaped guide member 96 which effects bending of the closure parts in a desired manner so that one part overlaps the other. When the carton blank is indexed into registration with the pressure pad 48 the pressure pad is caused to be actuated to press against the bottom closure parts and to seal the same. After two indexing movements which afford a cooling interval to the heated parts the carton blank is brought to a vertical or stripping position at which point the stripper mechanism actuated by the cam 114 is elevated so that the suction cups 104 contact the sealed bottoms of the carton blanks, as illustrated in FIG. 14, to grip the same. The mechanism then is caused to descend to the solid line position, also illustrated in FIG. 14, wherein the partially formed cartons are stripped from the mandrels and the bottoms of the carton blanks are disposed in registration with the track bar 110 located between the conveyor chains 106 and 107. The dogs 121 on the conveyor chains engage the carton blanks and move them along a straight path through the several stations which include top breaking mechanism 187 for breaking and pre-folding the top closure parts, filling mechanism 123, defoaming mechanism 188, heating means 189 for activating the thermoplastic coating, and finally the top closure sealing mechanism 190 for sealing the top closure parts of the carton. The means for effecting the above series of operations is described in detail in my copending application Ser. No. 409,911 filed Nov. 9, 1964, now Patent No. 3,405,505.

It will be understood that various changes and modifications may be made from the foregoing without departing from the spirit and scope of the appended claims.

What is claimed is:

1. In a machine for forming cartons of paperboard or the like from blanks, comprising in combination a magazine adapted to hold a supply of said blanks, a mandrel assembly rotatably driven with a step by step indexing motion, means for feeding blanks successively from said magazine to said mandrel assembly and for erecting said blanks into open ended tubular form as an incident to such feeding, means defining a plurality of stations with which said mandrel assembly is adapted to register for breaking the folds of the bottom closure parts and for closing and sealing said bottom closure parts, means for stripping said partially formed carton blanks from said mandrel assembly when said carton blanks are vertically disposed in upright position, said stripping means including a pneumatic cylinder having a reciprocable piston rod supporting a suction cup connected to suction means, conveyor means for moving said blanks as partially formed cartons linearly into registration with a series of stations, said conveyor means comprising a pair of cooperating endless chains having the inner reaches thereof arranged in generally parallel relation, a track bar disposed medially of said inner chain reaches, each chain having a series of spaced dogs with respective dogs of said chains cooperating to receive therebetween and to move partially formed cartons along said track bar, and means for adjusting the travel of said piston rod to limit the return travel of the same whereby to effect registration of carton blanks having different heights with the conveyor means.

2. In a machine for forming cartons of paperboard or the like from blanks, comprising in combination a magazine adapted to hold a supply of said blanks, a mandrel assembly rotatably driven with a step by step indexing motion, means for feeding blanks successively from said magazine to said mandrel assembly and for erecting said blanks into open ended tubular form as an incident to such feeding, means defining a plurality of stations with which said mandrel assembly is adapted to register for breaking the folds of the bottom closure parts and for closing and sealing said bottom closure parts, means for stripping said partially formed carton blanks from said mandrel assembly when said carton blanks are vertically disposed in upright position, conveyor means for moving said blanks as partially formed cartons linearly into registration with a series of stations, said conveyor means comprising a pair of cooperating endless chains having the inner reaches thereof arranged in generally parallel relation, a track bar disposed medially of said inner chain reaches, each chain having a series of spaced dogs with respective dogs of said chains cooperating to receive therebetween and to move partially formed cartons along said track bar.

3. The invention as defined in claim 2 in which the track bar is verticaly adjustable so as to permit registration of a variety of sizes of cartons with each of said last mentioned stations.

4. The invention as defined in claim 2 in which said stripping means is adjustable for registration with the adjusted position of said track bar.

5. The invention as defined in claim 2 in which the stripping means includes a pneumatic cylinder, an arm fixed to the piston rod of said cylinder and carrying a suction cup connected to suction means, an adjustable screw movable into one end of said cylinder and adapted to be engaged by the piston rod to limit the movement of said rod in its return travel, valve means connected to said suction cup and movable parallel to said screw, a guide rod depending from said arm and reciprocably movable therewith, and cam means carried on said guide rod for actuating said valve means to control the suction at said cup in accordance with the movement of said cup.

6. The invention as defined in claim 2 in which the leading end portions of said chain reaches are in nonparallel relation and converge inwardly to afford clearance for receiving a carton blank placed therebetween.

7. The invention as defined in claim 2 in which the dogs on the conveyor chains are arranged in confronting relation so as to embrace each of the corner portions of a respective carton.

8. The invention as defined in claim 2 in which the stripping means carries indicia for rapid adjustment of said stripping means to accommodate said means to carton blanks having different heights.

References Cited

UNITED STATES PATENTS

| | | | |
|---|---|---|---|
| 3,248,841 | 5/1966 | Heffelfinger et al. | 53—375 X |
| 3,364,826 | 1/1968 | Austin et al. | 53—186 X |

THERON E. CONDON, Primary Examiner

E. F. DESMOND, Assistant Examiner

U.S. Cl. X.R.

53—186